(12) United States Patent
Enumulapally et al.

(10) Patent No.: US 12,443,432 B2
(45) Date of Patent: Oct. 14, 2025

(54) AUTOMATED MANAGEMENT OF SCHEDULED EXECUTIONS OF INTEGRATION PROCESSES

(71) Applicant: Boomi, LP, Conshohocken, PA (US)

(72) Inventors: Anil Enumulapally, Leander, TX (US); Ryan Dare, Philadelphia, PA (US); Shailendra Burman, San Francisco, CA (US); Joel Alonzo, Raleigh, NC (US)

(73) Assignee: Boomi, LP, Conshohocken, PA (US)

( * ) Notice: Subject to any disclaimer, the term of this patent is extended or adjusted under 35 U.S.C. 154(b) by 857 days.

(21) Appl. No.: 17/717,976

(22) Filed: Apr. 11, 2022

(65) Prior Publication Data

US 2023/0325232 A1    Oct. 12, 2023

(51) Int. Cl.
*G06F 3/0482* (2013.01)
*G06F 9/46* (2006.01)
*G06F 3/04847* (2022.01)

(52) U.S. Cl.
CPC .............. *G06F 9/46* (2013.01); *G06F 3/0482* (2013.01); *G06F 3/04847* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 7,209,838 B1 * | 4/2007 | Wright | ............... | G01R 19/2513 700/297 |
| 8,578,386 B1 * | 11/2013 | Bali | ..................... | G06F 9/4893 718/104 |
| 11,720,466 B1 * | 8/2023 | Pandey | ............... | G06F 3/04842 715/764 |
| 2005/0010459 A1 * | 1/2005 | Kawabata | .......... | G06Q 10/0637 705/7.11 |
| 2009/0287739 A1 * | 11/2009 | Zhang | .................... | G06Q 10/06 |
| 2010/0010857 A1 * | 1/2010 | Fadell | .................... | G06Q 50/06 705/412 |
| 2010/0185882 A1 * | 7/2010 | Arnold | ................... | G06F 9/4893 713/320 |
| 2011/0130856 A1 * | 6/2011 | Fontanot | ................ | G06Q 10/06 700/100 |
| 2013/0218875 A1 * | 8/2013 | Carriri | .................... | G06F 16/25 707/722 |

(Continued)

Primary Examiner — Daniel Rodriguez
(74) Attorney, Agent, or Firm — Procopio, Cory, Hargreaves & Savitch, LLP

(57) ABSTRACT

Traditional batch-based extraction, transformation, and loading (ETL) of data is not suitable for dynamic real-time data integration. Accordingly, automated, scalable, and optimized management of scheduled executions of integration processes is disclosed. A graphical user interface may be used that comprises a timeline with a time axis, including a schedule section and a metric section that share the time axis. Each integration process is visually represented according to a scheduled start time and end time, and integration processes that overlap in execution time are stacked with respect to the time axis. The metric section comprises a visual representation of parameter(s) of the schedule as a function of time. The graphical user interface may be used to recommend time frames for new integration processes and/or display optimized schedules for the integration processes.

18 Claims, 8 Drawing Sheets

(56) References Cited

U.S. PATENT DOCUMENTS

| | | | |
|---|---|---|---|
| 2016/0170811 A1* | 6/2016 | Peacock | G06F 3/0482 |
| | | | 718/106 |
| 2021/0326897 A1* | 10/2021 | Inoue | G06F 16/2379 |
| 2024/0362840 A1* | 10/2024 | Matsumura | G06T 11/206 |

* cited by examiner

AUTOMATED MANAGEMENT OF SCHEDULED EXECUTIONS OF INTEGRATION PROCESSES

BACKGROUND

Field of the Invention

The embodiments described herein are generally directed to an integration platform, and more particularly, to automated management of scheduled executions of integration processes.

Description of the Related Art

As organizational needs increase, so does the number of software applications required by organizations to manage different aspects of their businesses. As the number of data sources and applications increases, faster and more efficient means are required to successfully and timely complete the data integration jobs that utilize these data sources and applications.

Traditionally, extraction, transformation, and loading (ETL) of data from endpoints (e.g., data sources, software applications, external systems, etc.) have been done via batch jobs that execute on manually configured schedules. However, the rise of application programming interfaces (APIs), implementing, for example, Representational State Transfer (REST), has provided the opportunity for data integration to occur at any moment (e.g., dynamically and in real time). At the same time, there have been growing concerns with climate change and its potential impacts. Thus, organizations are looking for ways to reduce their carbon footprints, even as they move their data integration to cloud computing environments.

What is needed are technologies that enable the conversion from traditional batch-based ETL into dynamic real-time data integration, in an automated, scalable, and optimized manner, preferably while minimizing the associated carbon footprint.

SUMMARY

Accordingly, systems, methods, and non-transitory computer-readable media are disclosed to for automated management of scheduled executions of integration processes.

In an embodiment, a method comprises using at least one hardware processor to: store a schedule for a plurality of integration processes to be executed within an integration platform; and generate a graphical user interface comprising a timeline with a time axis, wherein the timeline comprises a schedule section and a metric section that share the time axis, wherein, in the schedule section, each of the plurality of integration processes is visually represented as a graphical element that extends, relative to the time axis, from a start position that corresponds to a scheduled start time of the integration process within the schedule to an end position that corresponds to a scheduled end time of the integration process within the schedule, and any of the plurality of integration processes that overlap in execution time are stacked with respect to the time axis, and, wherein the metric section comprises a visual representation of one or more parameters of the schedule as a function of time relative to the time axis.

The method may further comprise using the at least one hardware processor to: receive one or more parameters for a new integration process; apply a model to identify one or more recommended time frames for the new integration process, based on the one or more parameters and the schedule; and update the timeline to visually represent the one or more recommended time frames relative to the time axis. The method may further comprise using the at least one hardware processor to update the graphical user interface to comprise an input for selecting a respective one of each of the one or more time frames. The method may further comprise using the at least one hardware processor to: receive a selection of one of the one or more time frames; and incorporate the new integration process into the schedule within the selected time frame. The method may further comprise using the at least one hardware processor to: generate feedback for the model based on the selected time frame; and retrain the model based on the generated feedback. The model may identify the one or more recommended time frames further based on greenhouse gas (GHG) emissions data. The GHG emissions data may associate a value of GHG emissions with utilization rates of one or more computing resources available to the integration platform. The one or more computing resources may comprise one or more of a processor, memory, data storage, or network bandwidth. The model may comprise a continuous optimization function.

The method may further comprise using the at least one hardware processor to: apply a model to optimize the schedule; and update the schedule section to visually represent each of the plurality of integration processes as a graphical element that extends, relative to the time axis, from a start position that corresponds to a scheduled start time of the integration process within the optimized schedule to an end position that corresponds to a scheduled end time of the integration process within the optimized schedule. The method may further comprise using the at least one hardware processor to: receive a confirmation of the schedule that is visually represented in the schedule section; in response to the confirmation, save the confirmed schedule in data storage; and execute the plurality of integration processes according to the saved schedule. The method may further comprise using the at least one hardware processor to: generate feedback for the model based on the saved schedule; and retrain the model based on the generated feedback. The model may comprise a continuous optimization function.

The one or more parameters that are visually represented in the metric section may comprise an energy usage of the plurality of integration processes.

The method may further comprise using the at least one hardware processor to, automatically: detect a spike in utilization by one or more of the plurality of integration processes; and, in response to the detected spike, execute one or more remedial measures. The one or more remedial measures may comprise limiting the one or more integration processes.

Each of the plurality of integration processes may represent a transaction that acquires data from at least one data source, processes the acquired data, and sends the processed data to at least one destination.

The at least one hardware processor may be comprised in a cloud infrastructure that dynamically allocates computing resources to elastically maintain a computing power required to execute the plurality of integration processes according to the schedule.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated management of scheduled executions of integration processes. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
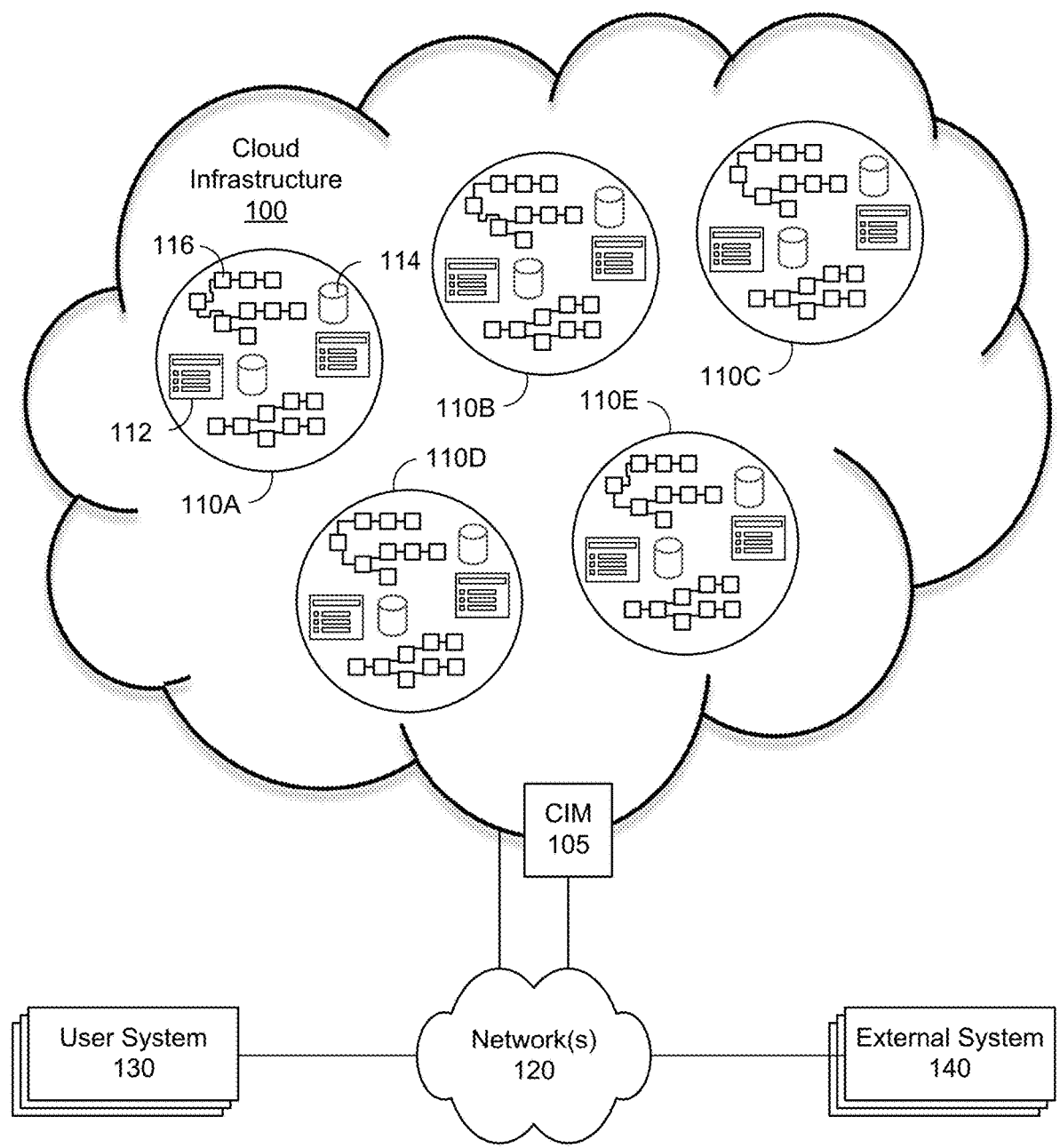
FIG. 1 illustrates an example infrastructure in which one or more of the processes described herein, may be implemented, according to an embodiment.

FIG. 1 illustrates an example infrastructure in which one or more of the disclosed processes may be implemented, according to an embodiment. The infrastructure may comprise a cloud infrastructure 100, which provides cloud computing services. Cloud infrastructure 100 may comprise a plurality of computing resources, including computer processors, memory, data storage, network bandwidth, and/or the like. These computer resources may be housed within a single data center or a plurality of data centers distributed over multiple geographic locations.

A cloud infrastructure manager (CIM) 105 may manage cloud infrastructure 100. Cloud infrastructure manager 105 may itself be hosted in cloud infrastructure 100 or may be external to cloud infrastructure 100. Cloud infrastructure manager 105 may dynamically allocate subsets of the available computing resources in cloud infrastructure 100 to each of a plurality of integrated platforms 110 on demand, with upscaling and downscaling of computing resources according to real-time demand, without direct active management by a user. In other words, cloud infrastructure 100 provides integrated platforms as a service (iPaaS). Each integrated platform 110 may comprise one or a plurality of applications 112, one or a plurality of databases 114, and/or one or a plurality of integration processes 116.

Each application 112 may be a cloud-based application that provides one or more services or functions within a business process. Examples of an application 112 include, without limitation, a website, a web application, and a web service, including, for example, applications for Enterprise Resource Planning (ERP), customer relationship management (CRM), scheduling, data storage and backup, invoicing, accounting, payment, business intelligence, supply chain management, human resources management, marketing automation, business process management and automation, information technology (IT), and/or the like.

Each database 114 may utilize a pool of data storage within the computing resources of cloud environment 100 to store structured and/or unstructured data. Structured data may comprise a relational database, such as MySQL™, Oracle™, IBM™, Microsoft SQL™, Access™, PostgreSQL™, MongoDB™, and the like, which stores data fields in indexed tables. Unstructured data may include, without limitation, multimedia (e.g., images, video, audio, etc.), text-heavy files, and/or the like, that are stored as files within a file system.

Each process 116 may represent a transaction involving the integration of data between two or more systems. A process 116 may comprise a series of steps that specify logic and transformation requirements for the data to be integrated. Each step may transform, route, and/or otherwise manipulate data to attain an end result from input data. For example, an initial step in a process 116 may retrieve data from one or more data sources, internal steps in a process 116 may manipulate the retrieved data in a specified manner, and a final step in a process 116 may send the manipulated data to one or more specified destinations. The manipulation may comprise any processing of the data, including, without limitation, analyzing, normalizing, altering, updating, and/or enhancing the data. Enhancing the data may comprise adding fields of data or metadata to the data.

Each process 116 may represent a business workflow or a portion of a business workflow or a transaction-level interface between two systems, and comprise, as one or more steps, software modules that process the data within process 116 to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

Each process 116 may communicate, in one or more steps, with one or more applications 112 and/or databases 114 within the same integration platform 110 and/or a different integration platform 110, and/or with one or more applications and/or databases within an external system 140. For example, a step in process 116 may interact with (e.g., retrieve data from or store data to) a database 114 within the same or a different integration platform 110, interact with (e.g., receive data from or send data to) an application 112 within the same or a different integration platform 110, and/or interact with (e.g., receive data from or send data to) an external system 140 via network(s) 120.

Cloud infrastructure 100 may be communicatively connected to one or more networks 120, which may include the Internet. Thus, one or a plurality of user systems 130 and/or one or a plurality of external systems 140 may communicate with cloud infrastructure 100, including with cloud infrastructure manager 105 and/or individual integration platforms 110, via network(s) 120, using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols.

While cloud infrastructure 100 is illustrated as being connected to various systems through a single set of network(s) 120, it should be understood that cloud infrastructure 100 may be connected to the various systems via different sets of one or more networks. For example, cloud infrastructure 100 may be connected to a subset of user systems 130 and/or external systems 140 via the Internet, but may be connected to one or more other user systems 130 and/or external systems 140 via an intranet. Furthermore, while only a single cloud infrastructure 100, several integration platforms 110, and a few user systems 130 and external systems 140 are illustrated, it should be understood that the infrastructure may comprise any number of cloud infrastructures 100, integration platforms 110, user systems 130, and external systems 140.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may be used to access an account with cloud infrastructure 100, according to one or more roles or permissions associated with a user of user system 130, who may be identified via authentication. The account may be associated with an organization and used to configure one or more integration platforms 110 for the organization via a graphical user interface provided by cloud infrastructure manager 105. Alternatively, user system 130 may be similarly used to access an account with an external system 140 that interfaces with cloud infrastructure manager 105, to configure one or more integration platforms 110 for the organization via a graphical user interface of external system 140. In this case, cloud infrastructure manager 105 may implement a web service, and external system 140 may interface with the web service via an application programming interface (API). Thus, it should be understood that as used herein and unless stated otherwise, any reference to a "graphical user interface" is a reference to any graphical user interface that is utilized to configure the integration platform(s) 110 associated with a user account representing an organization, regardless of whether the graphical user interface is generated by cloud infrastructure manager 105, an external system 140, a non-cloud server system hosting a stand-alone integration platform 110, or some other system.

2. Example Processing Device

Figure 2:
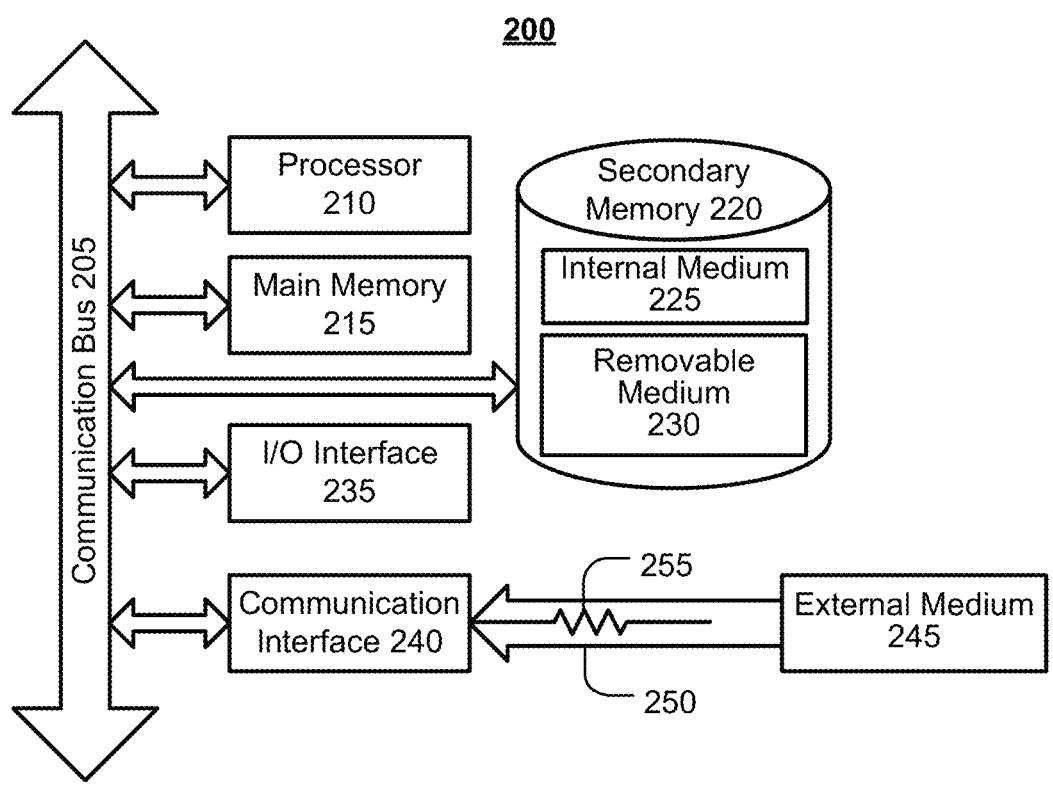
FIG. 2 illustrates an example processing system, by which one or more of the processes described herein may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute any of the implementing software) described herein, and may represent components of cloud infrastructure 100 (e.g., each of a plurality of servers that form cloud infrastructure 100), user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as any of the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

3. Overview

An integration platform 110 may be used by multiple teams within an organization to synchronize data across multiple business applications. For example, an integration platform 110 may assimilate data from a plurality of data sources and assemble the data into collective information. This collective information can assist in expedited decision-making and provide the organization with an edge over its competition. The Boomi AtomSphere™ Platform by Boomi, LP of Chesterbrook, Pennsylvania is one example of an iPaaS platform that provides integration platforms 110 in a cloud infrastructure 100.

Business applications (e.g., 112) are kept synchronized within an integration platform 110 using processes 116 as integration flows that are executed on a real-time or scheduled basis. The execution schedule is often driven by high-level business requirements, without any thought given to the available resources and concurrent load on integration platform 110. In many cases, in a shared environment, there are different teams that fail to collaborate on scheduling. The teams may not even have visibility into other processes 116 and their schedules. This results in unnecessary loads and spikes in the consumption of the available computing resources. This may not be as much of an issue in cloud computing environments, such as cloud infrastructure 100, which can automatically scale based on demand. However, in non-cloud computing environments in which automatic scaling is not available, it can lead to integration failures.

In addition, many integration platforms 110 hide the complexity of processes 116 and the management challenges, for example, behind an intuitive graphical user interface that can be utilized by novice users, without requiring a technical background. Thus, the underlying functions of integration platform 110 are typically hidden, such that users cannot exercise fine control over the implementation details. In the absence of such control and platform metrics, users must depend on trial and error to manage processes 116 harmoniously.

Thus, disclosed embodiments may consider run-time and/or underlying platform factors to optimize the utilization of platform resources and increase the success rates of processes 116. For example, execution metadata may be crowd-sourced from a plurality of processes 116 and/or a plurality of integration platforms 110 to inform scheduling. Additionally or alternatively, artificial intelligence (AI), such as machine-learning, may be used to analyze and optimize execution schedules, as well as provide smart scheduling recommendations that ensure higher success rates and optimize the availability of computing resources. For example, processes 116 with flexibility in their execution timing may be automatically scheduled or recommended for scheduling at the optimal times in terms of available computing resources, to increase performance and the likelihood of a successful integration. In addition, processes 116 may be automatically scheduled or recommended for scheduling at times that will minimize the emission of greenhouse gases (GHG) (e.g., at times when power from renewable energy sources is available), for example, to reduce the carbon footprint of integration platform 110. It should be understood that greenhouse gases may comprise carbon dioxide ($CO_2$), methane, nitrous oxide, black carbon, hydrofluorocarbons, and other pollutants.

In an embodiment, the crowd-sourced execution metadata may be dynamically classified and correlated with other data, such as resource telemetry (i.e., metrics of the computing resources), to produce a dataset. A machine-learning or other AI model may then be applied to the dataset to determine a schedule for executing one or more processes 116 that optimizes execution based on one or more constraints and/or other criteria. That schedule may be automatically implemented, semi-automatically implemented (e.g., with user confirmation), or recommended for manual implementation.

In an embodiment, the executed schedules, planned schedules, and/or recommended schedules may all be visually represented in the graphical user interface. In addition, metrics of the executed, planned, and/or recommended schedules may be visually represented in the graphical user interface as graphs, charts, tables, and/or the like. These visual representations may enable insights into the execution of processes 116, to allow a user to easily understand the health of processes 116 across an integration platform 110, and take appropriate action if necessary.

In an embodiment, metrics of executed schedules of processes 116 may be automatically analyzed by an analytic model to understand the health of processes 116 across an integration platform 110 and identify any execution problems. In this case, the analytic model may automatically and proactively trigger self-healing actions to resolve the execution problems, for example, by executing a model to optimize a future schedule of processes 116.

While processes will be primarily described herein as being performed for an integration platform 110 within a cloud infrastructure 100, it should be understood that the disclosed processes may be performed for any integration platform 110. For example, the processes may be performed for a stand-alone integration platform 110 that is operated on one or more dedicated servers, instead of within a cloud computing environment. Thus, it should be understood that the particular environment in which integration platform 110 is hosted is not essential to any embodiment.

4. Scheduling

Figure 3:
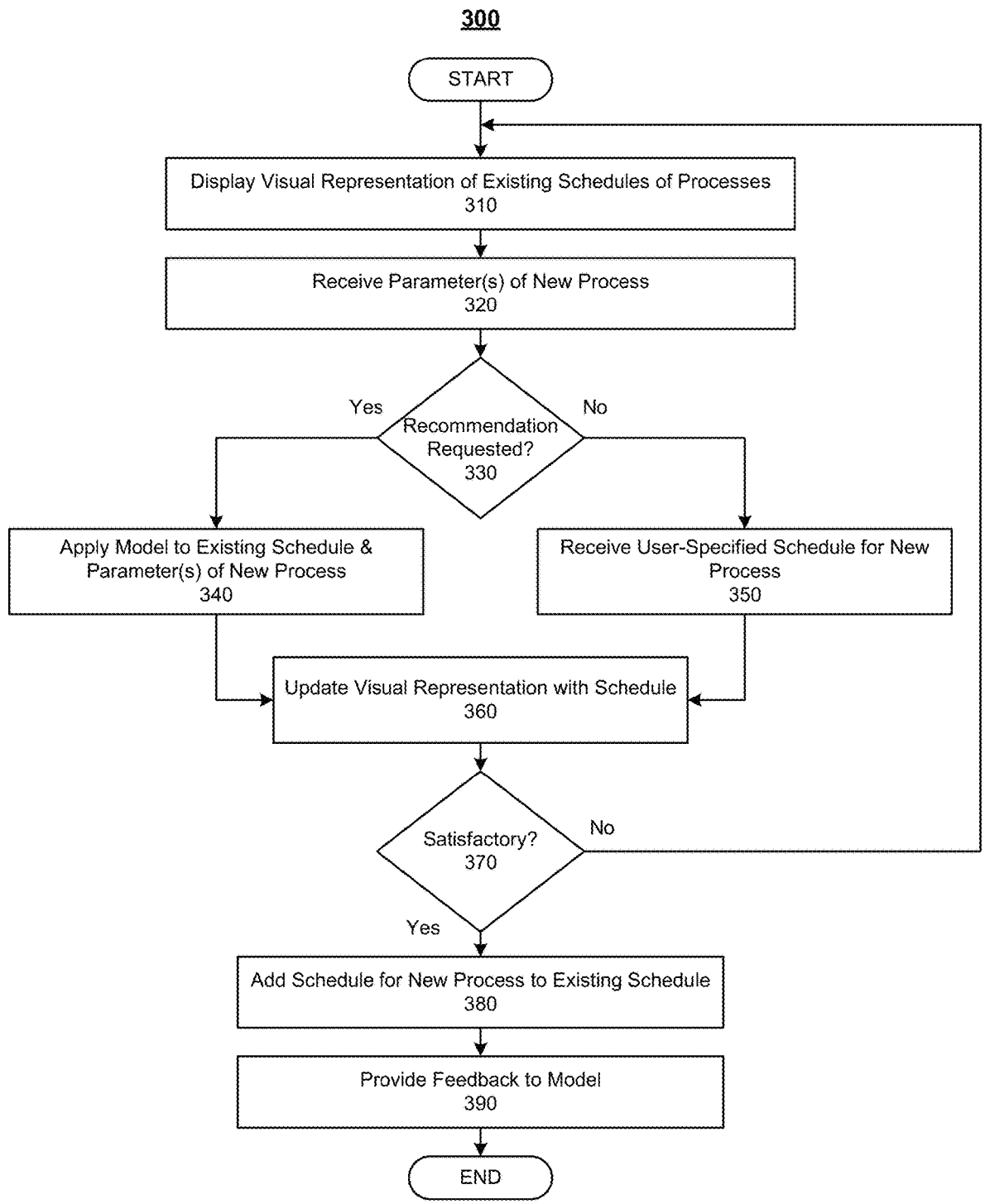
FIG. 3 illustrates a process for scheduling an integration process, according to an embodiment.

FIG. 3 illustrates a process 300 for scheduling an integration process 116, according to an embodiment. Process 300 may be implemented by cloud infrastructure manager 105, an external system 140, a non-cloud server system hosting a stand-alone integration platform 110, or the like. While process 300 is illustrated with a certain arrangement and ordering of subprocesses, process 300 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In subprocess 310, a visual representation of the existing schedule of processes 116 for the given integration platform 110 is displayed within the graphical user interface. The visual representation may comprise a timeline of a relevant period of time, with representations of each executed or scheduled process 116 positioned on the timeline, relative to a time axis, similar to a Gantt chart. For example, each representation of a process 116 may comprise a rectangle or other graphical representation that extends from a position representing the start time of that process 116 to a position representing the end time of that process 116, relative to the time axis, such that the rectangle for a process 116 is proportional to the execution duration of that process 116. The graphical user interface may also comprise one or more inputs for adding a new process 116, changing the start time, end time, and/or time span (e.g., 1 hour, 12 hours, 24 hours, custom time span, etc.) of the timeline, filtering the processes 116 that are displayed in the timeline (e.g., by process type, priority, scheduling flexibility, etc.), and/or the like. Thus, a user may easily view the time period of interest, and see all or a desired subset of processes 116 executed or scheduled to execute within the time period of interest, at positions corresponding to their start and end times.

It should be understood that if the timeline represents a past time period, it will only show executed processes 116, if the timeline represents a future time period, it will only show scheduled unexecuted processes 116, and, if the timeline spans a past and future time period, it will show both executed and scheduled unexecuted processes 116. The timeline that is relevant to disclosed embodiments will generally represent a reoccurring schedule, in which case, processes 116 before the current time may be represented as executed, while processes 116 after the current time may be represented as unexecuted. The timeline may also represent one or more parameters as a function of time along the same time axis, such as energy usage, carbon footprint, and/or the like for executed processes 116 and/or predicted energy usage, carbon footprint, and/or the like for scheduled processes 116.

In subprocess 320, one or more parameters are received for a new process 116. For example, as mentioned above, the graphical user interface may comprise one or more inputs for specifying the parameters of the new process 116. A user may use the one or more inputs to specify and submit the parameter(s) for the new process 116. The parameter(s) may comprise an identity of the new process 116 (e.g., via selection of the new process 116 from a list of available processes 116), a frequency at which the new process is to be executed (e.g., hourly, daily, weekly, etc.), a configuration of one or more variables used by the new process 116, and/or the like.

In subprocess 330, the user may request a recommended schedule for the new process 116. For example, the graphical user interface may comprise an input for requesting a recommended schedule for the new process 116, within the time period represented by the current timeline in the graphical user interface. If a recommendation is requested (i.e., "Yes" in subprocess 330), a recommended schedule may be generated in subprocess 340. Otherwise, if no recommendation is requested (i.e., "No" in subprocess 330), a user may specify a schedule in subprocess 350.

In subprocess 340, a model may be applied to the existing schedule, the parameter(s) received for the new process 116 in subprocess 320, and/or other data to generate a recommended schedule for the new process 116. In an embodiment, the model may be configured between a normal mode, which does not account for carbon emissions when generating the recommended schedule, and an eco-friendly mode, which does account for carbon emissions when generating the recommended schedule. The mode of the model may be preconfigured as a user setting or account setting, or may be specified by the user when requesting the recommended schedule (e.g., via one or more inputs of the graphical user interface). Alternatively, the model may always account for carbon emissions when generating the recommended schedule, always account for carbon emissions if sufficient data is available when generating the recommended schedule, or never account for carbon emissions when generating the recommended schedule.

In subprocess 350, a user-specified schedule for the new process 116 may be received. For example, the graphical user interface may comprise one or more inputs for specifying the schedule for the new process 116. The schedule may be specified as a specific start time at which to execute the new process 116, a specific end time at which execution of the new process 116 must be completed, or a specific time frame (e.g., start time and duration, start time and end time, etc.) in which to execute the new process 116.

In subprocess 360, the visual representation of the schedule of processes 116 is updated. In particular, the timeline may be updated to either reflect the recommended schedule from subprocess 340 or the user-specified schedule from subprocess 350, depending on which path was selected in subprocess 330. In the case of a user-specified schedule, the timeline may be updated to show the new process 116 at a position within the timeline that corresponds to the user-specified schedule. The new process may be represented as a rectangle or other graphical representation, extending from the start time to the end time in the schedule, such that the length of the rectangle represents the duration of the new process 116. In an embodiment in which the timeline also represents one or more parameters as a function of time (e.g., energy usage), the represented parameter(s) may also be updated to reflect the addition of the new process 116. In the case of a recommended schedule, the timeline may be updated to either show the new process 116 at a position within the timeline that corresponds to the recommended schedule (i.e., in the same or similar manner as described above with respect to the user-specified schedule), or highlight one or more recommended time windows in which scheduling of the new process 116 is recommended.

In subprocess 370, it may be determined whether the schedule, incorporating the new process 116, is satisfactory. For example, a user may view the timeline with the represented parameter(s), and determine whether or not the user is satisfied. In this case, the user may specify that the schedule is satisfactory and/or that the schedule is not satisfactory via one or more inputs in the graphical user interface. Alternatively, the determination may be performed automatically, for example, based on one or more parameters (e.g., energy usage or other performance metric(s)). If the schedule is satisfactory (i.e., "Yes" in subprocess 370), the schedule for the new process 116 may be formally incorporated into the existing schedule in subprocess 380. Otherwise, if the schedule is not satisfactory (i.e., "No" in subprocess 370), the timeline of the visual representation may be updated in subprocess 310 to no longer incorporate the schedule of the new process 116, and the user may specify different parameter(s) in subprocess 320, choose a different path in subprocess 330 (e.g., request a recommendation if the schedule was specified by the user in the prior iteration, specify a schedule if a recommendation was requested in the prior iteration, specify a new schedule from the schedule specified by the user in the prior iteration, request a new recommendation using different parameters, etc.), and/or the like.

In subprocess 380, the schedule for the new process 116 may be formally incorporated into the existing schedule. In other words, the schedule of the new process 116 may be saved to the existing schedule or the schedule with the new process 116 may be saved in place of the existing schedule. As a result, the new process 116 will be executed within integration platform 110, starting at the scheduled start time and/or ending at the scheduled end time within the updated schedule.

In subprocess 390, feedback may be provided to the model that is applied in subprocess 340. The feedback may comprise or represent the features of the schedule for the new project 116 that was added in subprocess 380, the features of a recommended schedule for the new project 116 that was rejected in subprocess 370, and/or the like. The feedback may be used to tune or retrain the model. For example, if the model is a machine-learning model, a batch of feedback may be collected and converted into a training dataset that is used to retrain the machine-learning model. Rejected recommended schedules may be used for negative reinforcement during the training, whereas added schedules may be used for positive reinforcement during the training.

Figure 4:
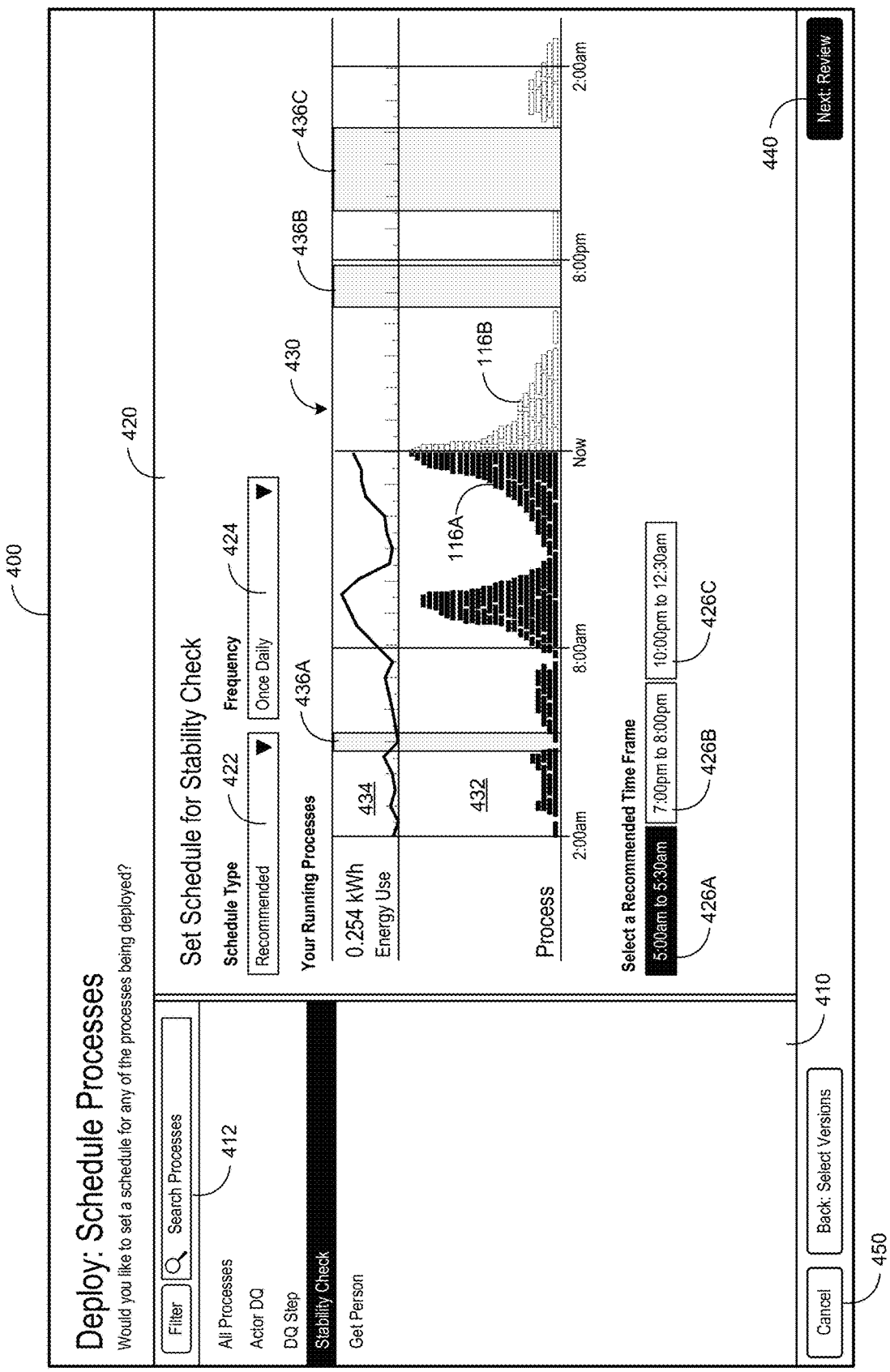
FIG. 4 illustrates an example screen of a graphical user interface for scheduling an integration process, according to an embodiment.

FIG. 4 illustrates an example of a screen 400 of the graphical user interface, comprising a timeline with recommended time windows, according to an embodiment. Screen 400 may represent the updated visual representation in subprocess 360, after a recommendation is requested in subprocess 330. In the illustrated embodiment, screen 400 comprises a process-selection section 410 and an informational section 420.

Process-selection section 410 may comprise a list of available processes 116. Each entry in the list is selectable, such that a user can select one of the available processes 116 in the list. Process-selection section 410 may also comprise a filter section 412 that provides one or more inputs for specifying one or more criteria by which to filter the list of available processes 116. For example, filter section 412 may comprise one or more predefined filters, as well as a search box for inputting keywords. It should be understood that only available processes 116 which satisfy the one or more criteria selected in filter section 412 (e.g., whose name or description comprise the input keyword(s)) will be displayed in the list of available processes 116. If no criteria are selected, then the list will include all available processes 116. The process 116 that the user selects from the list of available processes 116 may represent the new process 116 to be scheduled in process 300.

Informational section 420 comprises one or more inputs, such as inputs 422, 424, and 426, and a timeline 430. While specific inputs, features, and arrangements of those inputs and features will be described, it should be understood that informational section 420 may comprise different sets of inputs, features, and arrangements than those illustrated. It should also be understood that, anywhere a specific type of input is described herein, the specific type of input is simply one example, and may be replaced with any other suitable type of input.

Input 422 may comprise a drop-down menu by which the user may select an available schedule type for the new process 116. As an example, the available schedule types may comprise "custom," "recommend," and/or the like. If the "custom" type is selected, one or more inputs for specifying an exact time for the new process 116 may appear in informational section 420, such that the user may specify the exact time (e.g., start time and/or end time) at which to schedule the new process 116. Selection of the "custom" type may correspond to "No" in subprocess 330. If the "recommend" type is selected, the illustrated informational section 420 is displayed, including inputs 426A, 426B, and 426C (collectively referred to herein as inputs 426). Selection of the "recommend" type may correspond to "Yes" in subprocess 330, such that a model is executed in subprocess 340.

Input 424 may comprise a drop-down menu by which the user may select a frequency at which the new process 116 is to be executed. For example, available frequencies may comprise hourly, daily, weekly, monthly, and/or the like. Whenever a frequency is selected via input 424, timeline 430 may be updated to reflect one time period of the selected frequency. In the illustrated example, a frequency of daily has been selected. Thus, the displayed timeline 430 represents one reoccurring 24-hour time period. The displayed timeline 430 may be centered on the current time, such that the user can see a past time period (e.g., representing executed processes 116, including executed durations of processes currently being executed) and a future time period (e.g., represented scheduled but unexecuted processes 116, including unexecuted durations of processes currently being executed) that are equal in time span (e.g., 12 hours in the illustrated example).

Input 426 represents one or more recommended time frames, within the time period represented by the timeline, that are recommended by the model that was executed in subprocess 340. An input 426 may be provided for each time frame, in chronological order. In the illustrated example, three time frames were identified, and therefore, three inputs 426 are provided. Input 426A corresponds to a first time frame of 5:00 am to 5:30 am, input 426B corresponds to a second time frame of 7:00 pm to 8:00 pm, and input 426C corresponds to a third time frame of 10:00 pm to 12:30 am. The user may select one of inputs 426 to select a particular time frame in which to schedule the new process 116.

Timeline 430 comprises a schedule section 432 and a metric section 434, along a common time axis. Schedule section 432 comprises a representation of each process 116 within the time period represented by timeline 430. Executed processes 116 may be visually distinguished from scheduled but unexecuted subprocess 116. For example, process 116A (e.g., filled with one color, such as black) is an example of an executed process, whereas process 116B (e.g., filled with a different color, such as white) is an example of an unexecuted process. Similarly, the executed portion of each process 116 that spans across the current point in time may be visually distinguished (e.g., filled with one color, such as black) from the unexecuted portion of that same process 116 (e.g., filed with a different color, such as white). Processes 116 that overlap in execution period may be stacked (e.g., vertically in the illustrated example) within schedule section, similar to a Gantt chart, such that time periods of simultaneous process executions and their relative severities can be easily identified. It should be understood that time periods with more simultaneous process executions may generally represent time periods of higher resource usage than time periods with fewer simultaneous process executions.

Schedule section 432 may also comprise recommended time frames 436, which may be represented as rectangles (e.g., highlighted in a different color than the background of timeline 430) overlaid on timeline 430. Each time frame 436 corresponds to one of inputs 426. For example, time frame 436A corresponds to input 426A, time frame 436B corresponds to input 426B, and time frame 436C corresponds to input 426C. Alternatively or additionally, each time frame 436 may itself be an input for selecting the respective time period within the time period represented by timeline 430. Time frames 436A, 436B, and 436C are collectively referred to herein as time frames 436. In particular, each time frame 436 visually represents a time period, relative to the time axis, within which the new process 116 is recommended to be executed. Notably, time frames 436 may extend across both schedule section 432 and metric section 434, such that the processes 116 executed or scheduled within the time period represented by each time frame 436, as well as the metrics corresponding to those processes 116, are visible and correlated within each time frame 436.

In an embodiment, in which the model is operating in an eco-friendly mode, each recommended time frame 436 may be associated with an additional amount of estimated emissions (not shown) that will result if the new process 116 is scheduled within that time frame 436. As an example, the estimated emissions may be displayed as a carbon footprint measured in CO2 equivalent (CO2e), which refers to the number of metrics tons of $CO_2$ emissions with the same global warning potential as one metric ton of another greenhouse gas (e.g., as calculated using Equation A-1 in Title 40 of the Code of Federal Regulations, Part 98). It should be understood that each time frame 436 may be associated with a different additional amount of estimated emissions. Thus, the user can easily view different options for scheduling the new process 116 and how each option will affect the overall carbon footprint of the schedule.

Metric section 434 may comprise the values of one or more parameters as a function of time along the same time axis as schedule section 432. In the illustrated example, the value of a single parameter is depicted. In particular, the parameter is energy use. Since metric section 434 utilizes the same time axis as schedule section 432, a user may easily view the value of each parameter, relative to the executed processes 116 depicted in schedule section 432. Metric section 434 may also include a total value of each parameter (e.g., "0.254 kWh" of energy use in the illustrated example).

Once a user has selected a recommended time frame (e.g., selected input 426A in the illustrated example), an input 440 may be enabled. Selection of input 440 may cause the graphical user interface to transition from screen 400 to a subsequent screen, within a wizard, for scheduling the new process 116 within the selected time frame 436, enabling a user to select a specific start and/or end time within the selected time frame 436, prompting the user for confirmation to schedule the new process 116 at a specific start and/or end time within the selected time frame 436, and/or the like. Selection of input 440 may correspond to "Yes" in subprocess 370. Alternatively, the user may select a cancel input 450 (or back input), which may cause the graphical user interface to transition from screen 400 to a previous screen within the wizard. Selection of input 450 may correspond to "No" in subprocess 370.

Figure 5:
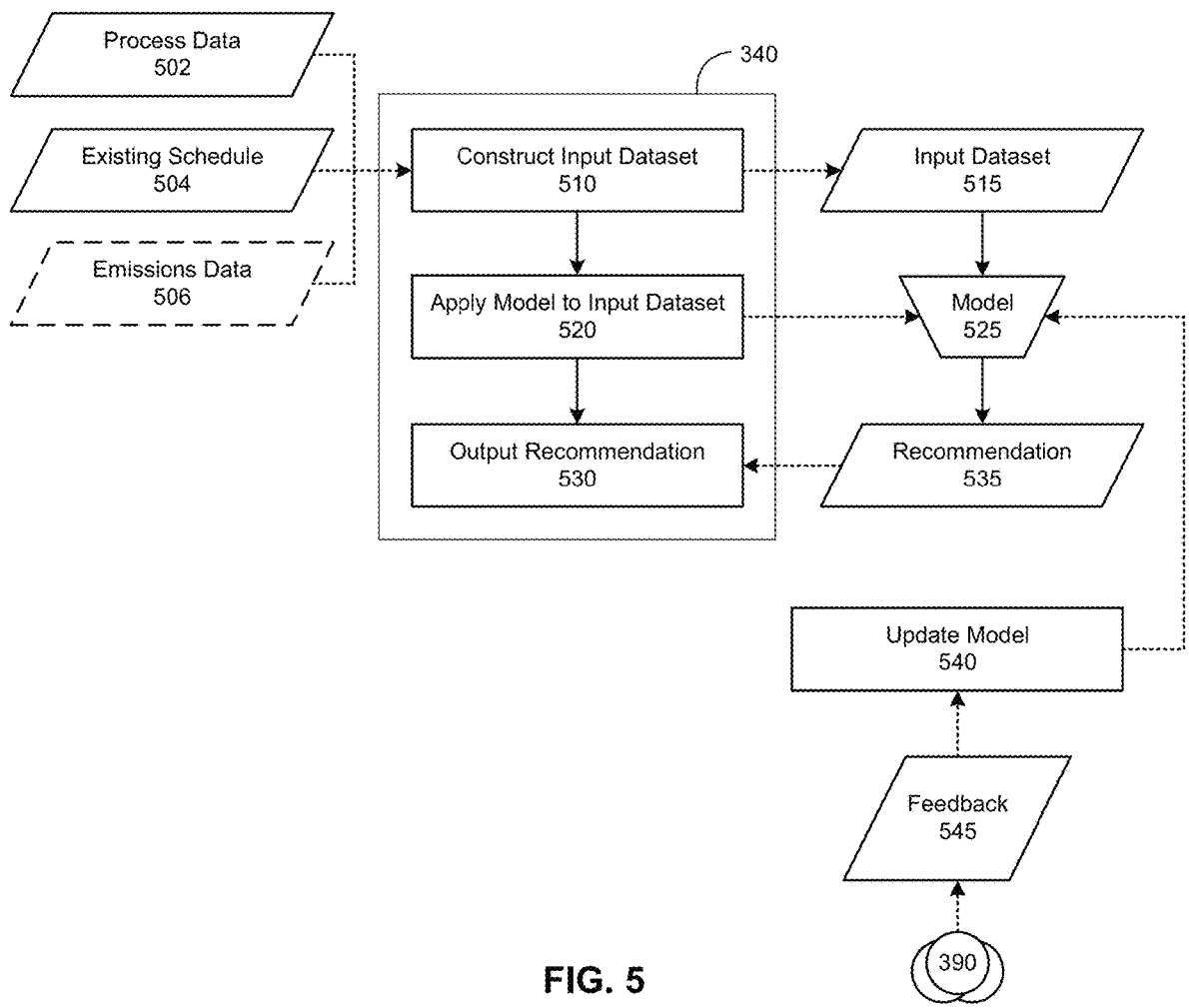
FIG. 5 illustrates an example architecture for applying a model during scheduling of an integration process, according to an embodiment.

FIG. 5 illustrates an example architecture 500 for applying a model 525 in subprocess 340, according to an embodiment. While architecture 500 is illustrated with a certain arrangement and ordering of components, architecture 500 may be implemented with fewer, more, or different components and a different arrangement and/or ordering of components. Furthermore, it should be understood that one or more components of architecture 500 may operate independently from other components of architecture 500 unless explicitly described as dependent on each other.

In step 510, subprocess 340 may construct an input dataset 515 from process data 502 and/or the existing schedule 504 for the relevant time period. If model 525 is operating in the eco-friendly mode or always considers emissions, subprocess 340 may also construct input dataset 515 from emissions data 506. Input dataset 515 may represent process data 502, existing schedule 504, and/or emissions data 506 in any format that is suitable for model 525. For example, input dataset 515 may comprise a feature vector comprising a vector of values for each of a plurality of features that are utilized by model 525. Step 510 may clean, normalize, correlate, and/or otherwise preprocess the data when constructing input dataset 515.

Process data 502 may comprise data related to the new process 116 that is the subject of the request for a recommended schedule. Process data 502 may include, without limitation, flexibility in the scheduling (e.g., binary value representing whether or not there is flexibility, a numerical or enumeration value representing a degree of flexibility, etc.), a priority of the new process 116 (e.g., a numerical or enumeration value representing a priority relative to other processes 116), run-time execution metadata for the new process 116, such as an execution duration of the new process 116 (e.g., an expected time duration required to complete execution of the new process 116), a data volume (e.g., an expected amount of data that will be processed by the new process 116), required computing resources (e.g., an expected amount of CPU utilization, memory utilization, data storage utilization, network utilization, etc., that will be required for execution of the new process 116), and/or the like, a desired time frame, one or more scheduling preferences, one or more business requirements or other constraints, and/or the like. Process data 502 may also comprise similar or the same or a subset of the same data for each of the processes 116 in existing schedule 504.

At least a subset of process data 502 may be acquired as, or derived from, the parameter(s) received in subprocess 320. Additionally or alternatively, at least a subset of process data 502 may be acquired or derived from another data source, such as a database that associates processes 116 with one or more parameters representing process data 502 and/or from which process data 502 is derived. As an example, parameters such as flexibility and priority may be acquired from the parameters received in subprocess 320, whereas parameters such as the run-time execution metadata may be automatically retrieved from a database in step 510 of subprocess 340.

Existing schedule 504 may comprise a representation of the existing schedule of processes 116 for the relevant time period (e.g., one time period of the selected frequency, represented by timeline 430). Step 510 may retrieve existing schedule 504 from a database associated with the requesting user's account. It should be understood that existing schedule 504 may be stored in any suitable manner.

Emissions data 506 may represent or model GHG emissions associated with the computing resources required by the new process 116 and/or the processes 116 in existing schedule 504. For example, emissions data 306 may associate an estimated rate or amount of emissions with each of a plurality of rates of CPU utilization, each of a plurality of rates of memory utilization, each of a plurality of rates of data storage utilization, each of a plurality of rates of network utilization, and/or the like. Alternatively, one or more resource utilizations may be associated with an algorithm or other model that accepts a utilization rate as input and outputs an estimated rate or amount of emissions. In any case, step 510 may derive estimated rates or amounts of emissions for the new process 116 and/or processes 116 in existing schedule 504 from emissions data 506, and incorporate the estimated amounts of emissions into input dataset 515 for use by model 525.

Emissions data 506 may be acquired from an internal or external data source. For example, emissions data 506 may be retrieved via an API from a tool, such as the Amazon Web Services (AWS) carbon footprint tool. An overall carbon footprint may be apportioned or mapped to individual or sets of processes 116 and/or integration platform 110 based on a proportion of resources used by those process(es) 116 or integration platform 110.

It should be understood that input dataset 515 comprises the set of data used by model 525 to produce recommendation 535 (e.g., a recommended schedule or time frame(s) for the new process 116). In an embodiment, input dataset 515 may comprise a representation of the new process 116 (e.g., derived from process data 502), including a desired schedule, scheduling preferences, one or more business requirements and/or other constraints, and/or the like. In addition, input dataset 515 may comprise a representation of existing schedule 504, which identifies time slots in which the run-time is busy executing processes, such that model 525 can minimize overlapping executions of processes 116. Input dataset 515 may also comprise a representation of emissions data 506, which may identify emissions associated with the utilization of various computing resources.

In step 520, model 525 is applied to input dataset 515. In particular, input dataset 515 is input into model 525 to produce a recommendation 535. Model 525 may be a machine-learning model, such as a discrete or continuous optimization function that identifies optimal placement of the new process 116 within existing schedule 504. Discrete optimization refers to the minimization or maximization of a function of one or more discrete variables (e.g., binary variables), subject to zero, one, or a plurality of constraints. Suitable discrete optimization techniques include, without limitation, integer linear programming, combinatorial optimization, and/or the like. Continuous optimization refers to the minimization or maximization of a function of one or more continuous or real variables, subject to zero, one, or a plurality of constraints. Suitable continuous optimization techniques include, without limitation, derivative free optimization, nonlinear equations, nonlinear least-squares problem, bound constrained optimization, linear programming, quadratic programming, semi-definite programming, nonlinear programming, semi-infinite programming, and/or the like. Various examples of machine-learning models that may be used for model 525 are described, for instance, in Sun et al., "A Survey of Optimization Methods from a Machine Learning Perspective," arXiv:1906.06821v2 (2019), Lin et al., "Continuous Time Optimization Approach for Medium-Range Production Scheduling of a Multi-Product Batch Plant," Ind. Eng. Chem. Res. 2002, 41, 16, 3884-3906, doi.org/10.1021/ie011002a (2002), Tompkins, "Optimization Techniques for Task Allocation and Scheduling in Distributed Multi-Agent Operations," Thesis (M. Eng.), Massachusetts Institute of Technology, Dept. of Electrical Engineering and Computer Science (2003), and Castro et al., "New Continuous-Time Scheduling Formulation for Continuous Plants under Variable Electricity Cost, Ind. Eng. Chem. Res. 2009, 48, 14, 6701-6714 (2009), which are all hereby incorporated herein by reference as if set forth in full. Alternatively, model 525 may be any other suitable type of model, including non-machine-learning models, such as a priority queue or the like.

In step 530, the recommendation 535 that is produced by model 525 may be outputted (e.g., to subprocess 360). Recommendation 535 may comprise representations of one or more time frames (e.g., represented as a start time and end time, a start time and duration, an end time and duration, etc.) within which the new process 116 is recommended to be executed. It should be understood that the recommended time frame(s), output by model 525, may correspond to time frame(s) 436 in timeline 430.

Independently of subprocess 340, model 525 may be updated via a process 540. In particular, process 540 may receive feedback 545 from one or more iterations of subprocess 390. Process 540 may utilize feedback 545 to periodically tune or retrain model 525 (e.g., in batches). For example, if model 525 is a machine-learning model, a training dataset may be constructed from feedback 545 and used to train model 525 using any suitable supervised or unsupervised learning technique. In the case of discrete or continuous optimization, one or more weights of the respective function may be adjusted to minimize or maximize the function when applied to the training dataset.

5. Optimization

Figure 6:
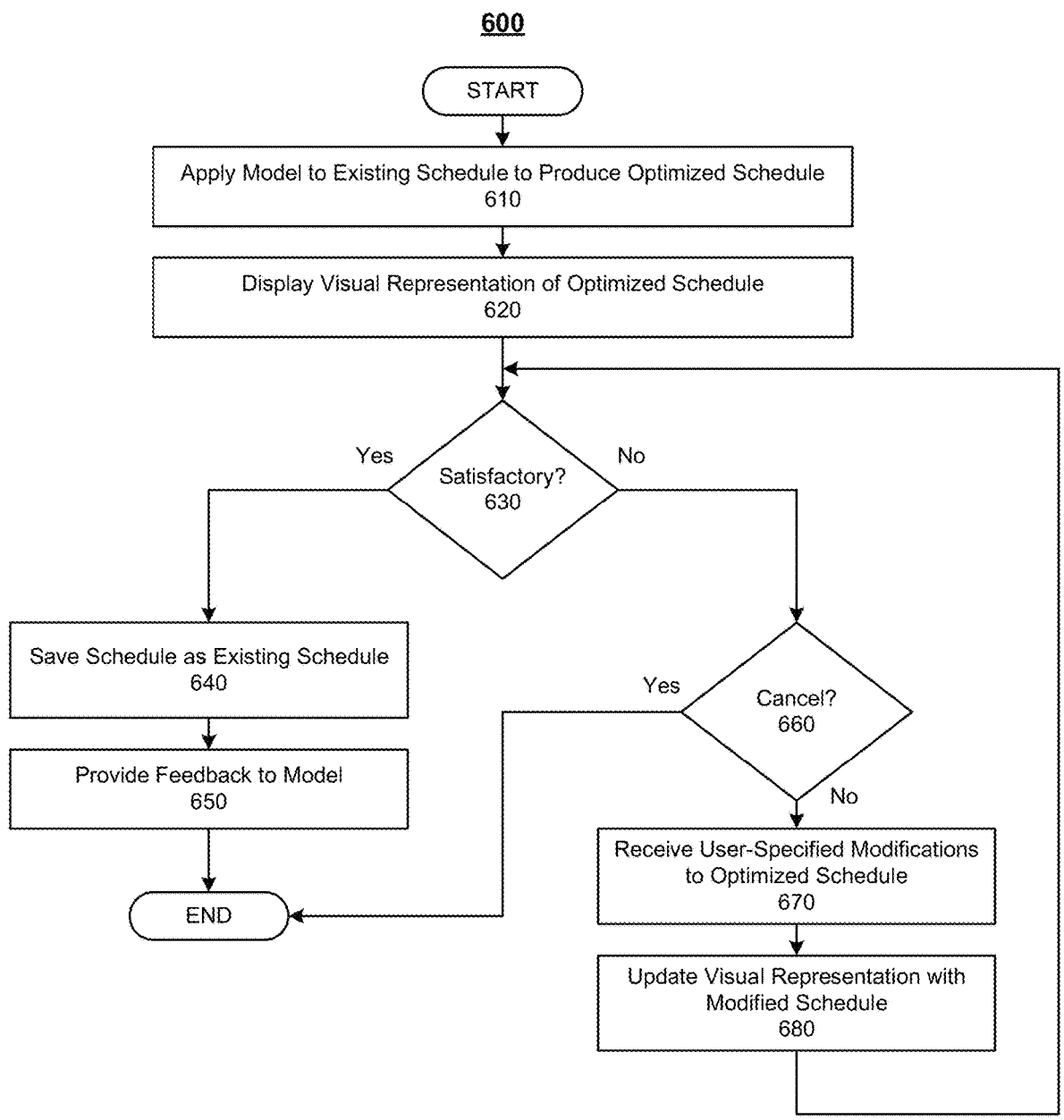
FIG. 6 illustrates a process for optimizing a schedule of integration processes, according to an embodiment.

FIG. 6 illustrates a process 600 for optimizing a schedule of integration processes 116, according to an embodiment. Process 600 may be implemented by cloud infrastructure manager 105, an external system 140, a non-cloud server system hosting a stand-alone integration platform 110, or the like. While process 600 is illustrated with a certain arrangement and ordering of subprocesses, process 600 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

Process 600 may be initiated by a user. For example, the graphical user interface may comprise one or more inputs for initiating process 600 for optimizing an existing schedule of processes 116. Alternatively or additionally, process 600 may be initiated automatically. In this case, process 600 may be executed periodically (e.g., after the expiration of each of a plurality of time intervals) and/or in response to some other triggering event (e.g., one or more performance metrics satisfying a user-specified, account, system, or alert threshold). In an embodiment, process 600 may be executed automatically in response to a trigger output by an analytic model that analyzes historical executions of processes 116, within integration platform 110, to detect execution problems. When the analytic model detects an execution problem, the analytic model may automatically trigger process 600 as a self-healing action. It should be understood that even in cases in which process 600 is initiated automatically, user confirmation or approval of the new schedule (e.g., potentially with user-specified modifications) may be required prior to updating or overwriting the existing schedule with the optimized schedule.

In subprocess 610, a model may be applied to the existing schedule of processes 116 for a given integration platform 110 to generate an optimized schedule for processes 116. In an embodiment, the model may be configured between a normal mode, which does not account for carbon emissions when generating the optimized schedule, and an eco-friendly mode, which does account for carbon emissions when generating the optimized schedule. The mode of the model may be preconfigured as a user setting or account setting, or may be specified by the user when requesting the optimized schedule (e.g., via one or more inputs of the graphical user interface). Alternatively, the model may always account for carbon emissions when generating the optimized schedule, always account for carbon emissions if sufficient data is available when generating the optimized schedule, or never account for carbon emissions when generating the optimized schedule.

In subprocess 620, a visual representation of the optimized schedule of processes 116 is displayed within the graphical user interface. The visual representation may comprise a timeline of the period of time for which optimization is being performed, with representations of each executed or scheduled process 116 positioned on the timeline, relative to a time axis, similar to a Gantt chart. For example, each representation of a process 116 may comprise a rectangle or other graphical representation that extends from a position representing the start time of that process 116 to a position representing the end time of that process 116, relative to the time axis, such that the rectangle for a process 116 is proportional to the execution duration of that process 116. Thus, a user may easily view the time period of interest, and see all or a desired subset of processes 116 executed or scheduled to execute within the time period of interest, at positions corresponding to their start and end times.

In subprocess 630, it may be determined whether the optimized schedule is satisfactory. For example, a user may view the timeline, which may optionally include one or more performance parameters, and determine whether or not the user is satisfied. In this case, the user may specify that the schedule is satisfactory and/or that the schedule is not satisfactory via one or more inputs in the graphical user interface. Alternatively, the determination may be performed automatically, for example, based on one or more parameters (e.g., energy usage or other performance metric(s)). If the schedule is satisfactory (i.e., "Yes" in subprocess 630), the existing schedule may be updated or overwritten by the optimized schedule in subprocess 640. Otherwise, if the schedule is not satisfactory (i.e., "No" in subprocess 630), a determination is made as to whether or not to cancel the optimization in subprocess 660.

In subprocess 640, the schedule is saved as the existing schedule. In other words, the optimized schedule, which may or may not have been modified by the user, may be saved in place of the existing schedule or the existing schedule may be updated to reflect the optimized schedule. Thereafter, processes 116 in the given integration platform 110 will be executed according to the newly saved schedule.

In subprocess 650, feedback may be provided to the model that is applied in subprocess 610. The feedback may comprise or represent the features of the schedule that was saved in subprocess 640, the features of the optimized schedule produced in subprocess 610 (e.g., prior to any user-specified modifications), and/or the like. The feedback may be used to tune or retrain the model. For example, if the model is a machine-learning model, a batch of feedback may be collected and converted into a training dataset that is used to retrain the machine-learning model. Rejected optimized schedules may be used for negative reinforcement during the training, whereas saved schedules may be used for positive reinforcement during the training.

In subprocess 660, it may be determined whether the optimization is canceled. For example, a user may select an input within the graphical user interface to cancel the optimization. If the schedule is canceled (i.e., "Yes" in subprocess 660), process 600 may end without overwriting or otherwise modifying the existing schedule, such that the existing schedule is retained. Otherwise, as long as the schedule is not canceled (i.e., "No" in subprocess 660), one or more user-specified modifications may be received in subprocess 670.

In subprocess 670, one or more user-specified modifications to the schedule may be received. For example, the graphical user interface may comprise one or more inputs for specifying modifications to the schedule. Modifications may include, without limitation, moving one or more processes 116 to a different start time, end time, and/or time frame within the schedule, adding one or more processes 116 to the schedule, deleting one or more processes 116 from the schedule, and/or the like.

In subprocess 680, the visual representation of the schedule of processes 116 is updated. In particular, the timeline may be updated to reflect any user-specified modification(s) received in subprocess 670. In an embodiment in which the timeline also represents one or more parameters as a function of time (e.g., energy usage), the represented parameter(s) may also be updated to reflect the user-specified modification(s). Process 600 may then return to subprocess 630. Thus, a user may iteratively tune the schedule until the user either is satisfied with the schedule (i.e., "Yes" in subprocess 630) or cancels the optimization process (i.e., "Yes" in subprocess 660).

Figure 7:
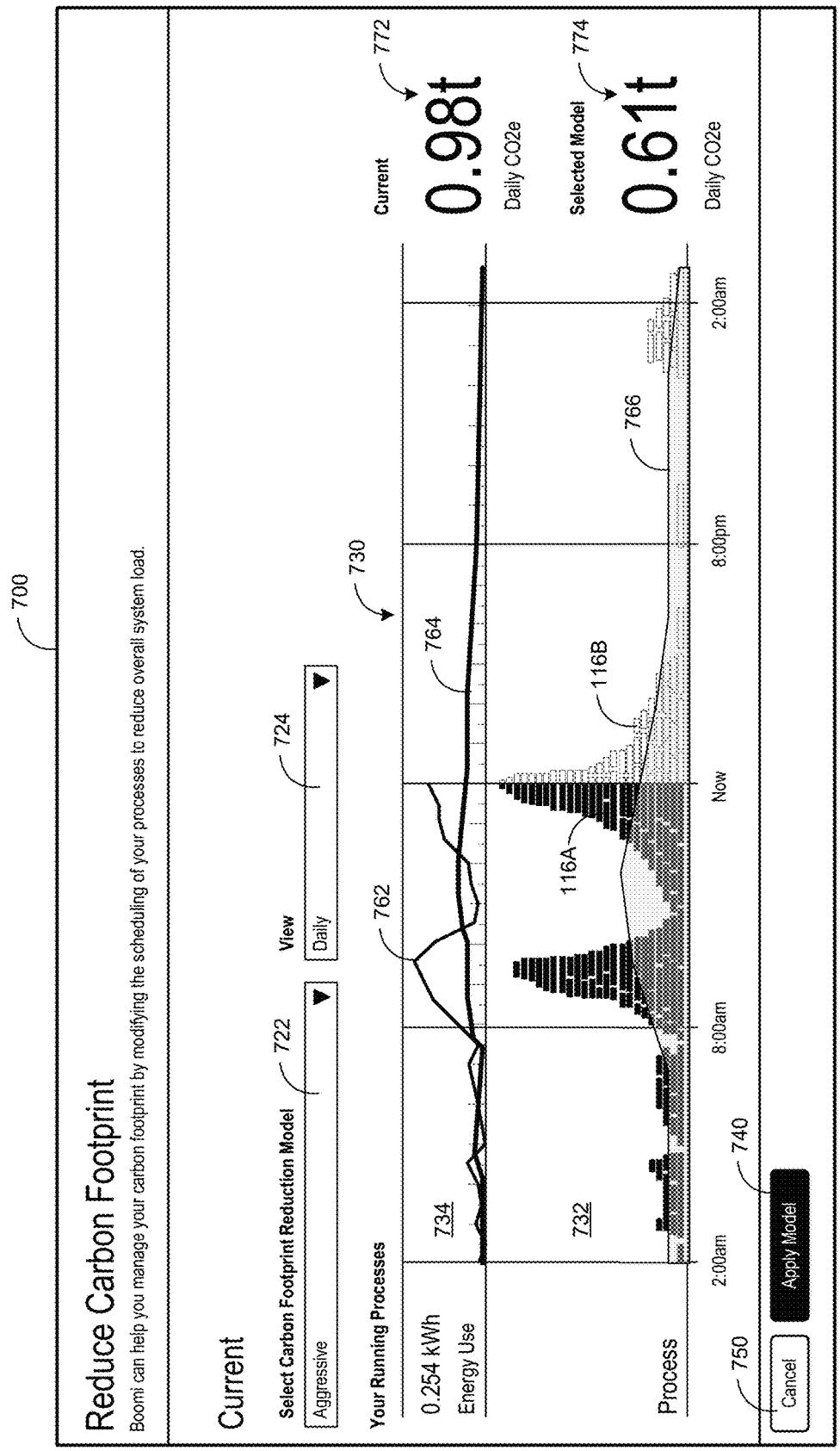
FIG. 7 illustrates an example screen of a graphical user interface for optimizing a schedule of integration processes, according to an embodiment.

FIG. 7 illustrates an example of a screen 700 of the graphical user interface, representing an optimized schedule, according to an embodiment. Screen 700 may represent the visual representation displayed in subprocess 620 or updated in subprocess 680. Screen 700 may comprise one or more inputs, such as inputs 722, 724, 740, and 750, as well as a timeline 730. While specific inputs, features, and arrangements of those inputs and features will be described, it should be understood that screen 700 may comprise different sets of inputs, features, and arrangements than those illustrated. It should also be understood that, anywhere a specific type of input is described herein, the specific type of input is simply one example, and may be replaced with any other suitable type of input.

Input 722 may comprise a drop-down menu by which the user may select a model. As an example, the available models may comprise "aggressive," "moderate," "conservative," "custom," "none," and/or the like. The "aggressive," "moderate," and "conservative" models may all be the same or different models that trade-off one parameter against another parameter to varying degrees. For example, in the illustrated example, the model is operated in an eco-friendly mode or otherwise configured to minimize GHG emissions (e.g., $CO_2$) produced by the schedule of processes 116. In this case, the "aggressive" version of the model may achieve lower emissions than the "moderate" and "conservative" versions of the model by more aggressively rescheduling processes 116 within the existing schedule (e.g., rescheduling more processes 116, moving processes 116 greater distances along the time axis, etc.), more aggressively overlapping executions of processes 116 (e.g., to maximize renewable energy sources, but potentially increasing the risk of an execution failure due to overutilization of computing resources), and/or more aggressively reducing overlapping executions of processes 116 (e.g., to decrease utilizations of computing resources, to produce lower emissions, but at the risk of not maximizing renewable energy sources). Similarly, the "moderate" version of the model may achieve lower emissions than the "conservative" version of the model, but higher emissions than the "aggressive" version of the model. If the "custom" model is selected, one or more inputs for specifying one or more hyperparameters of the model may appear in screen 700, such that a user may specify hyperparameter(s) of the model (e.g., a desired range of emissions that the model must achieve, a level of flexibility in rescheduling, etc.). If "none" is selected, screen 700 may simply display the schedule, potentially with any user-specified modifications (e.g., received in one or more iterations of subprocess 670). Whenever a user selects a model via input 722, timeline 730 may be automatically updated to reflect the selected model.

Input 724 may comprise a drop-down menu by which the user may select a time period to view. For example, available time periods may comprise hourly, daily, weekly, monthly, a custom time period, and/or the like. Whenever a time period is selected via input 724, timeline 430 may be updated to reflect the selected time period. In the illustrated example, a time period of one day has been selected. Thus, the displayed timeline 730 represents one 24-hour time period. The displayed timeline 730 may be centered on the current time. Notably, processes 116A that have been executed (i.e., prior to the current time) may be visually distinguished from processes 116B (e.g., filled with different colors) that have not yet been executed (i.e., scheduled for execution after the current time) within the selected time period, and the executed duration of each process 116 that spans across the current point in time may be visually distinguished from the unexecuted duration of that same process 116 (e.g., filled with different colors).

Timeline 730 comprises a schedule section 732 and a metric section 734, along a common time axis. Schedule section 732 comprises a representation of each process 116 within the time period represented by timeline 730 (e.g., selected in input 724). Executed processes 116 may be visually distinguished from scheduled but unexecuted subprocess 116. For example, process 116A (e.g., filled with one color, such as black) is an example of an executed process, whereas process 116B (e.g., filled with a different color, such as white) is an example of an unexecuted process. Similarly, the executed duration of each process 116 that spans across the current point in time may be visually distinguished (e.g., filled with one color, such as black) from the unexecuted duration of that same process 116 (e.g., filled with a different color, such as white). Processes 116 that overlap in execution period may be stacked (e.g., vertically in the illustrated example) within schedule section, similar to a Gantt chart, such that time periods of simultaneous process executions and their relative severities can be easily identified.

Schedule section 732 may also comprise a profile 766 of the optimized schedule, overlaid over the existing schedule. In the illustrated example in which the "aggressive" model has been selected, it can be seen that the optimized schedule has a smoother profile 766 than the existing schedule, such that processing is more evenly distributed across the time period. This may reflect the minimization of resource utilization (e.g., to obtain the reduction in emissions associated with, for example, a lower rate of CPU and/or other resource utilization) and/or the maximization of renewable energy sources (e.g., by shifting process execution towards time periods in which available solar power, wind power, hydroelectric power, and/or the like is at a maximum).

Metric section 734 may comprise the values of one or more parameters as a function of time along the same time axis as schedule section 732. In the illustrated example, the value of a single parameter is depicted. In particular, the parameter is energy use. Notably, both a profile 762 of the energy use of the existing schedule and a profile 764 of the energy use of the optimized schedule are depicted in metric section 734. Since metric section 734 utilizes the same time axis as schedule section 732, a user may easily view the value of each parameter, relative to the executed processes 116 depicted in schedule section 732. Metric section 734 may also include a total value of each parameter (e.g., "0.254 kWh" of energy use for the existing schedule in the illustrated example).

Screen 700 may also display the value of a target variable being optimized by the model, with and without the optimization. For example, screen 700 comprises a value 772 of the estimated emissions produced by the existing schedule of processes 116, as well as a value 774 of the estimated emissions produced by the optimized schedule of processes 116. Alternatively or additionally, screen 700 could comprise a difference between the values 772 and 774. Thus, a user may easily identify the improvement in the target variable that is achieved by the selected model. As an example, estimated CO2 emissions may be displayed as a carbon footprint measured in CO2e.

Once a user has selected the desired model (e.g., via input 722), the user may select input 740. Selection of input 740 may cause the graphical user interface to transition from screen 700 to a subsequent screen, within a wizard, for viewing the specifics of the optimized schedule (e.g., viewing processes 116 on timeline 730 at their positions within the optimized schedule), specifying modifications to the optimized schedule (e.g., corresponding to subprocess 670), saving the optimized schedule (e.g., corresponding to subprocess 640), and/or the like. Alternatively, the user may select a cancel input 750, which may cause the graphical user interface to transition from screen 700 to a previous screen within the wizard or exit the wizard. Selection of input 750 may correspond to "Yes" in subprocess 660.

Figure 8:
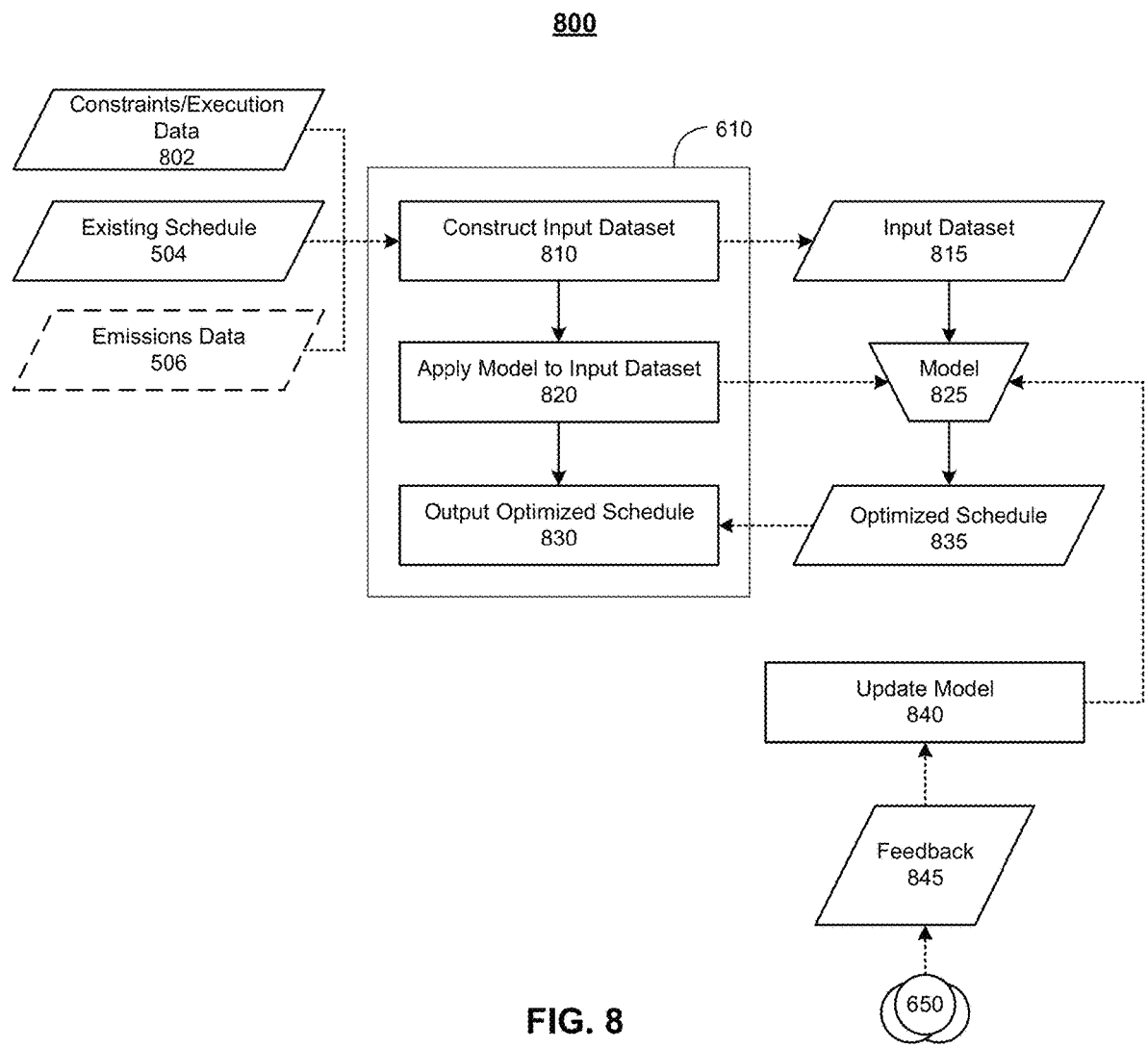
FIG. 8 illustrates an example architecture for applying a model for optimizing a schedule of integration processes, according to an embodiment.

FIG. 8 illustrates an example architecture 800 for applying a model 825 in subprocess 610, according to an embodiment. While architecture 800 is illustrated with a certain arrangement and ordering of components, architecture 800 may be implemented with fewer, more, or different components and a different arrangement and/or ordering of components. Furthermore, it should be understood that one or more components of architecture 800 may operate independently from other components of architecture 800 unless explicitly described as dependent on each other.

In step 810, subprocess 610 may construct an input dataset 815 from constraints/execution data and/or the existing schedule 504 for the relevant time period. If model 825 is operating in the eco-friendly mode, subprocess 610 may also construct input dataset 815 from emissions data 506. Input dataset 815 may represent constraints/execution data 802, existing schedule 504, and/or emissions data 506 in any format that is suitable for model 825. For example, input dataset 815 may comprise a feature vector comprising a vector of values for each of a plurality of features that are utilized by model 825. Step 810 may clean, normalize, correlate, and/or otherwise preprocess the data when constructing input dataset 815. Existing schedule 504 and emissions data 506 have been previously described with respect to architecture 500, and therefore, will not be redundantly described herein.

Constraints/execution data 802 may comprise data related to one or more business constraints, other constraints, and/or run-time execution metadata for the processes 116 in existing schedule 504. Constraints/execution data 802 may be acquired or derived from a data source, such as a database that associates processes 116 with one or more parameters representing data 802 and/or from which data 802 is derived. The constraints may include priorities, flexibilities, dependencies, and/or the like, of processes 116 in existing schedule 504. The run-time execution metadata may include execution durations, data volumes, computing resources, number of overlapping executions, and/or the like, of processes 116 in existing schedule 504. The run-time execution metadata for a process 116 may be determined (e.g., averaged) from historical executions of that process 116 or similar process(es) 116. In an embodiment, the historical executions, from which the run-time execution metadata is derived, may be crowd-sourced from a plurality of processes 116 and/or integration platforms 110 (e.g., across different organizations).

It should be understood that input dataset 815 comprises the set of data used by model 825 to produce optimized schedule 835. In an embodiment, input dataset 515 may comprise a representation of the priorities, flexibilities, dependencies, and run-time execution metadata for the processes 116 in existing schedule 504. In addition, input dataset 815 may comprise a representation of existing schedule 504, which identifies time slots in which the run-time is busy executing processes, such that model 825 can minimize overlapping executions of processes 116. Input dataset 815 may also comprise a representation of emissions data 506, which may identify emissions associated with the utilization of various computing resources.

The priorities of processes 116 in input dataset 815 may be user-specified. For example, mission-critical processes 116 may have a higher priority than other processes. Model 825 may be constrained to ensure that mission-critical processes 116 are executed during times frames with the highest likelihood of successful execution. It should be understood that time frames with the highest likelihood of successful execution may be those with the lowest or relatively low utilization of computing resources. Thus, model 825 may consider (e.g., attempt to minimize) the number of simultaneously executing processes 116, especially during time periods in which mission-critical processes 116 are scheduled for execution, in order to minimize total utilization of computer resources at critical points within the time period.

The flexibilities of processes 116 in input dataset 815 may be user-specified. Many processes 116, other than mission-critical processes 116, will have at least some leeway in terms of the time frames in which they can be executed. Model 825 may be constrained to schedule one or more relatively inflexible processes 116 within specific time frames, while being free to schedule relatively flexible processes 116 within various time frames or any time frame.

The dependencies of processes 116 in input dataset 815 may be user-specified and/or determined automatically based on the processes 116 themselves. For example, a first process 116 may accept, as input, the output of a second process 116, in which case, it can be automatically determined that the first process 116 is dependent upon successful completion of the second process 116. Model 825 may be constrained to adhere to these dependencies when scheduling processes 116. Using the above example, model 825 may be constrained to schedule the first process 116 after the scheduled end time of the second process 116. Model 825 is not similarly constrained with respect to independent processes 116, which may be scheduled in any order or with parallel (e.g., overlapping) executions.

Input dataset 815 may comprise the execution duration of each process 116 in existing schedule 504. Available run-time resources are inversely proportional to the execution durations of processes 116 executing at run-time. This is because the longer the execution duration of a process 116 is, the longer the utilized computing resources are tied up in execution and unavailable to other processes 116. Thus, model 825 may account for execution durations of processes 116 when determining an optimized schedule.

Input dataset 815 may comprise the data volume of each process 116 in existing schedule 504. The volume of data processed by a process 116 is inversely proportional to the resource availability for other processes 116. This is because the larger the data volume for a process 116 is, the longer it takes the process 116 to complete and the greater the CPU and memory utilization required by the process 116. Thus, model 825 may account for the data volumes of processes 116 when determining an optimized schedule.

Input dataset 815 may comprise the utilization of one or more computing resources required by each process 116 in existing schedule 504. The amount of available CPU, memory, network bandwidth, and/or the like directly affects the performance of processes 116. Thus, model 825 may account for the amounts or rates of utilization of one or more computing resources by processes 116 when determining an optimized schedule.

In step 820, model 825 is applied to input dataset 815. In particular, input dataset 815 is input into model 825 to produce an optimized schedule 835. Model 825 may be a machine-learning model, such as discrete or continuous optimization, as described elsewhere herein, that identifies optimal placement of processes 116 within the relevant time period to minimize or maximize the target variable (e.g., minimize emissions), subject to zero, one, or a plurality of constraints. Various examples of machine-learning models that may be used for model 825 are described, for instance, in Sun et al., Lin et al., Tompkins, and Castro et al., which have all been incorporated herein by reference. Alternatively, model 825 may be another type of model, including non-machine-learning models, such as a priority queue or the like.

In step 830, the optimized schedule 835 that is produced by model 825 may be outputted (e.g., to subprocess 620). Optimized schedule 835 may comprise a recommended schedule for each of processes 116 in existing schedule 504. Each recommended schedule for a process 116 may be associated with a confidence value that represents a confidence that the recommended schedule for that process 116 is optimal. Thus, the recommended schedules in optimized schedule 835 may have varying degrees of confidence. This enables optimized schedule 835 to be filtered to subsets of the recommended schedules based on the confidence values and/or modified based on the confidence values.

Independently of subprocess 610, model 825 may be updated via a process 840. In particular, process 840 may receive feedback 845 from one or more iterations of subprocess 650. Process 840 may utilize feedback 845 to periodically tune or retrain model 825 (e.g., in batches). For example, if model 825 is a machine-learning model, a training dataset may be constructed from feedback 845 and used to train model 825 using any suitable supervised or unsupervised learning technique. In the case of discrete or continuous optimization, one or more weights of the respective function may be adjusted to minimize or maximize the function when applied to the training dataset.

6. Example Use Cases

Processes 300 and 600 enable the visualization of schedules per run-time period. Users can utilize process 300 or 600 to visualize the execution of processes 116 in their integration platform 110 during the run-time period. The graphical user interface provides a timeline (e.g., 430 and/or 730) that can succinctly represent execution times, execution durations, frequency of execution, success and/or failure rates, and/or the like of processes 116 during the run-time period. The timeline also enables the user to quickly understand the run-time loads and identify periods of high and low execution activity (e.g., via the stacked representations of processes 116 in timeline 430 or 730).

In addition, processes 300 and 600 apply models (e.g., 525 and 825, respectively) to optimize scheduling, for example, by scheduling processes 116 so as to more evenly distribute the utilization of computing resources across the run-time period, and/or avoid or minimize periods of very high and/or very low utilization of computing resources. The use of these models to evaluate multiple factors increases the likelihood of successful integrations by processes 116 and improves the performance of integration platform 110. It also eliminates the guesswork and expensive run-time execution analysis required to schedule integration batch jobs.

The visualizations of schedules (e.g., illustrated in screens 400 and 700) may also be used to provide insights about the executions of processes 116, including success and failure rates, periods or cycles of low and high utilization, and/or the like. These insights may be used in trend analysis (e.g., to predict periods when the availability of computing resources is optimal, identify computational trends, etc.), anomaly detection, and/or other analytics. Users may visualize changes in data volumes, identify patterns in the executions of processes 116, and/or the like, to aid in upscaling or downscaling their integration infrastructures (e.g., within cloud infrastructure 100). Process failures can also be identified and measured, to detect underlying problems in the integration infrastructure and/or processes 116 (e.g., application endpoints). The models may also be used to determine an emissions score (e.g., carbon footprint) for schedules and/or recommend schedules that improve an emissions score.

In addition, sudden spikes in transactions (e.g., represented as spikes in the utilizations of computing resources by one or more processes 116) can be automatically detected as potential cybersecurity threats. In response to the detection of a potential cybersecurity threat, as represented by a sudden spike in transactions, one or more remedial measures may be automatically triggered. For example, these remedial measures may comprise sending an alert to one or more recipients (e.g., via a user dashboard, email message, text message, telephone communication, and/or any other communication method), terminating, limiting, or otherwise modifying execution of the process(es) 116 that are causing the spike, blocking access to an application 112 and/or database 114, and/or the like. For example, a cybersecurity response module (e.g., executed by cloud infrastructure manager 105, external system 140, a stand-alone server system hosting integration platform 110, etc.) may automatically detect a sudden spike in the utilization of computing resources by specific process(es) 116 that utilize data from a specific database 114, and responsively and automatically limit the specific process(es), for example, by block accessing to that database 114, terminate, suspend, or throttle down computing resources allocated to the specific process(es) 116, and/or the like, and/or alert one or more recipients.

In one specific example, a user may utilize process 300 to schedule a new process 116. The user can specify a frequency of the new process 116, a preferred time at which to the execute the new process 116, a priority of the new process 116, a degree of flexibility of the new process 116, a dependency of the new process 116 (e.g., on one or more other processes 116), a valid time frame in which the new process 116 can be executed, and/or the like. Model 525 may use this data to determine one or more recommended time frames for the new process 116. The graphical user interface may identify the recommended time frame(s) for the new process 116 within a timeline 430 of the existing schedule, so that the user can easily visualize the incorporation of the new process 116 into the existing schedule. The user may select one of the recommended time frame(s) as the schedule for the new process 116, and save that schedule for the new process 116, such that the schedule for the new process 116 is incorporated into the existing schedule of processes 116. Alternatively, the user may specify a different schedule for the new process 116. In either case, feedback may be provided to model 525 based on the rejected and/or accepted scheduling.

In another specific example, a user may utilize process 600 to optimize an existing schedule of processes 116 of an integration platform 110. Over time, user(s) of an integration platform 110 may schedule numerous processes 116 for execution. A user may trigger application of model 825 to the existing schedule (e.g., via a user input of the graphical user interface), according to constraints (e.g., priorities, flexibilities, dependencies, etc.) and/or execution data (e.g., historical run-time execution metadata). Model 825 may output an optimized schedule that is visually represented within a timeline 730 of the graphical user interface. The optimized schedule may comprise different confidence values for the scheduling of different processes 116. The user may accept the optimized schedule in its entirety, filter timeline 730 to view or accept only those schedules with a threshold confidence level, modify the optimized schedule in any manner that is necessary or desired, and/or the like. In either case, feedback may be provided to model 825 based on the rejected and/or accepted scheduling.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   store a schedule for a plurality of integration processes to be executed within an integration platform; and
   generate a graphical user interface comprising a timeline with a time axis, wherein the timeline comprises a schedule section and a metric section that share the time axis,
      wherein, in the schedule section, each of the plurality of integration processes is visually represented as a graphical element that extends, relative to the time axis, from a start position that corresponds to a scheduled start time of the integration process within the schedule to an end position that corresponds to a scheduled end time of the integration process within the schedule, and any of the plurality of integration processes that overlap in execution time are stacked with respect to the time axis, and,
      wherein the metric section comprises a visual representation of one or more parameters of the schedule as a function of time relative to the time axis;
   receive one or more parameters for a new integration process;
   apply a model to identify one or more recommended time frames for the new integration process, based on the one or more parameters and the schedule;
   update the timeline to visually represent the one or more recommended time frames relative to the time axis; and
   update the graphical user interface to comprise an input for selecting a respective one of each of the one or more recommended time frames.

2. The method of claim 1, further comprising using the at least one hardware processor to:

receive a selection of one of the one or more recommended time frames; and
incorporate the new integration process into the schedule within the selected time frame.

3. The method of claim 2, further comprising using the at least one hardware processor to:
generate feedback for the model based on the selected time frame; and
retrain the model based on the generated feedback.

4. The method of claim 1, wherein the model identifies the one or more recommended time frames further based on greenhouse gas (GHG) emissions data.

5. The method of claim 4, wherein the GHG emissions data associate a value of GHG emissions with utilization rates of one or more computing resources available to the integration platform.

6. The method of claim 5, wherein the one or more computing resources comprise one or more of a processor, memory, data storage, or network bandwidth.

7. The method of claim 1, wherein the model comprises a continuous optimization function.

8. The method of claim 1, further comprising using the at least one hardware processor to:
apply a model to optimize the schedule; and
update the schedule section to visually represent each of the plurality of integration processes as a graphical element that extends, relative to the time axis, from a start position that corresponds to a scheduled start time of the integration process within the optimized schedule to an end position that corresponds to a scheduled end time of the integration process within the optimized schedule.

9. The method of claim 8, wherein the model comprises a continuous optimization function.

10. The method of claim 1, wherein the one or more parameters that are visually represented in the metric section comprise an energy usage of the plurality of integration processes.

11. The method of claim 1, further comprising using the at least one hardware processor to, automatically:
detect a spike in utilization by one or more of the plurality of integration processes; and
in response to the detected spike, execute one or more remedial measures.

12. The method of claim 11, wherein the one or more remedial measures comprise limiting the one or more integration processes.

13. The method of claim 1, wherein each of the plurality of integration processes represents a transaction that acquires data from at least one data source, processes the acquired data, and sends the processed data to at least one destination.

14. The method of claim 1, wherein the at least one hardware processor is comprised in a cloud infrastructure that dynamically allocates computing resources to elastically maintain a computing power required to execute the plurality of integration processes according to the schedule.

15. A method comprising using at least one hardware processor to:
store a schedule for a plurality of integration processes to be executed within an integration platform; and
generate a graphical user interface comprising a timeline with a time axis, wherein the timeline comprises a schedule section and a metric section that share the time axis,
wherein, in the schedule section, each of the plurality of integration processes is visually represented as a graphical element that extends, relative to the time axis, from a start position that corresponds to a scheduled start time of the integration process within the schedule to an end position that corresponds to a scheduled end time of the integration process within the schedule, and any of the plurality of integration processes that overlap in execution time are stacked with respect to the time axis, and,
wherein the metric section comprises a visual representation of one or more parameters of the schedule as a function of time relative to the time axis apply a model to optimize the schedule; and
update the schedule section to visually represent each of the plurality of integration processes as a graphical element that extends, relative to the time axis, from a start position that corresponds to a scheduled start time of the integration process within the optimized schedule to an end position that corresponds to a scheduled end time of the integration process within the optimized schedule;
receive a confirmation of the schedule that is visually represented in the schedule section;
in response to the confirmation, save the confirmed schedule in data storage; and
execute the plurality of integration processes according to the saved schedule.

16. The method of claim 15, further comprising using the at least one hardware processor to:
generate feedback for the model based on the saved schedule; and
retrain the model based on the generated feedback.

17. A system comprising:
at least one hardware processor; and
one or more software modules that are configured to, when executed by the at least one hardware processor,
store a schedule for a plurality of integration processes to be executed within an integration platform, and
generate a graphical user interface comprising a timeline with a time axis, wherein the timeline comprises a schedule section and a metric section that share the time axis,
wherein, in the schedule section, each of the plurality of integration processes is visually represented as a graphical element that extends, relative to the time axis, from a start position that corresponds to a scheduled start time of the integration process within the schedule to an end position that corresponds to a scheduled end time of the integration process within the schedule, and any of the plurality of integration processes that overlap in execution time are stacked with respect to the time axis, and,
wherein the metric section comprises a visual representation of one or more parameters of the schedule as a function of time relative to the time axis;
receive one or more parameters for a new integration process,
apply a model to identify one or more recommended time frames for the new integration process, based on the one or more parameters and the schedule,
update the timeline to visually represent the one or more recommended time frames relative to the time axis, and
update the graphical user interface to comprise an input for selecting a respective one of each of the one or more recommended time frames.

18. A non-transitory computer-readable medium having instructions stored therein, wherein the instructions, when executed by a processor, cause the processor to:
- store a schedule for a plurality of integration processes to be executed within an integration platform; and
- generate a graphical user interface comprising a timeline with a time axis, wherein the timeline comprises a schedule section and a metric section that share the time axis,
  - wherein, in the schedule section, each of the plurality of integration processes is visually represented as a graphical element that extends, relative to the time axis, from a start position that corresponds to a scheduled start time of the integration process within the schedule to an end position that corresponds to a scheduled end time of the integration process within the schedule, and any of the plurality of integration processes that overlap in execution time are stacked with respect to the time axis, and,
  - wherein the metric section comprises a visual representation of one or more parameters of the schedule as a function of time relative to the time axis;
- receive one or more parameters for a new integration process;
- apply a model to identify one or more recommended time frames for the new integration process, based on the one or more parameters and the schedule;
- update the timeline to visually represent the one or more recommended time frames relative to the time axis; and
- update the graphical user interface to comprise an input for selecting a respective one of each of the one or more recommended time frames.

* * * * *